(12) United States Patent
Sycoff

(10) Patent No.: US 11,741,545 B2
(45) Date of Patent: Aug. 29, 2023

(54) MONETIZING FINANCIAL BROKERAGE DATA

(71) Applicant: Andrew Garrett Sycoff, Gardiner, NY (US)

(72) Inventor: Andrew Garrett Sycoff, Gardiner, NY (US)

(*) Notice: Subject to any disclaimer, the term of this patent is extended or adjusted under 35 U.S.C. 154(b) by 0 days.

(21) Appl. No.: 17/837,905

(22) Filed: Jun. 10, 2022

(65) Prior Publication Data

US 2022/0301060 A1   Sep. 22, 2022

Related U.S. Application Data

(63) Continuation of application No. 16/232,731, filed on Dec. 26, 2018, now Pat. No. 11,393,027, which is a continuation of application No. 14/589,302, filed on Jan. 5, 2015, now abandoned, which is a continuation of application No. 13/489,301, filed on Jun. 5, 2012, now abandoned.

(60) Provisional application No. 61/636,508, filed on Apr. 20, 2012.

(51) Int. Cl.
*G06Q 40/04* (2012.01)
*G06Q 40/06* (2012.01)
*G06Q 40/02* (2023.01)

(52) U.S. Cl.
CPC ............ *G06Q 40/04* (2013.01); *G06Q 40/02* (2013.01); *G06Q 40/06* (2013.01)

(58) Field of Classification Search
CPC ...................................................... G06Q 40/04
USPC ...................................................... 705/35–45
See application file for complete search history.

(56) References Cited

U.S. PATENT DOCUMENTS

| | | | |
|---|---|---|---|
| 8,433,645 B1 * | 4/2013 | Waelbroeck | G06Q 40/00 705/37 |
| 2010/0325062 A1 * | 12/2010 | O'Shaughnessy | G06Q 40/06 705/37 |
| 2012/0221486 A1 * | 8/2012 | Leidner | G06Q 40/08 705/36 R |

* cited by examiner

*Primary Examiner* — Robert R Niquette
(74) *Attorney, Agent, or Firm* — Reed Smith LLP

(57) ABSTRACT

Method and systems for monetizing financial brokerage accounts are disclosed. One aspect for certain embodiments includes mining data from financial brokerage accounts and monetizing the mined data and providing to the customer an unlimited number of free trades for an unlimited period of time.

20 Claims, 2 Drawing Sheets

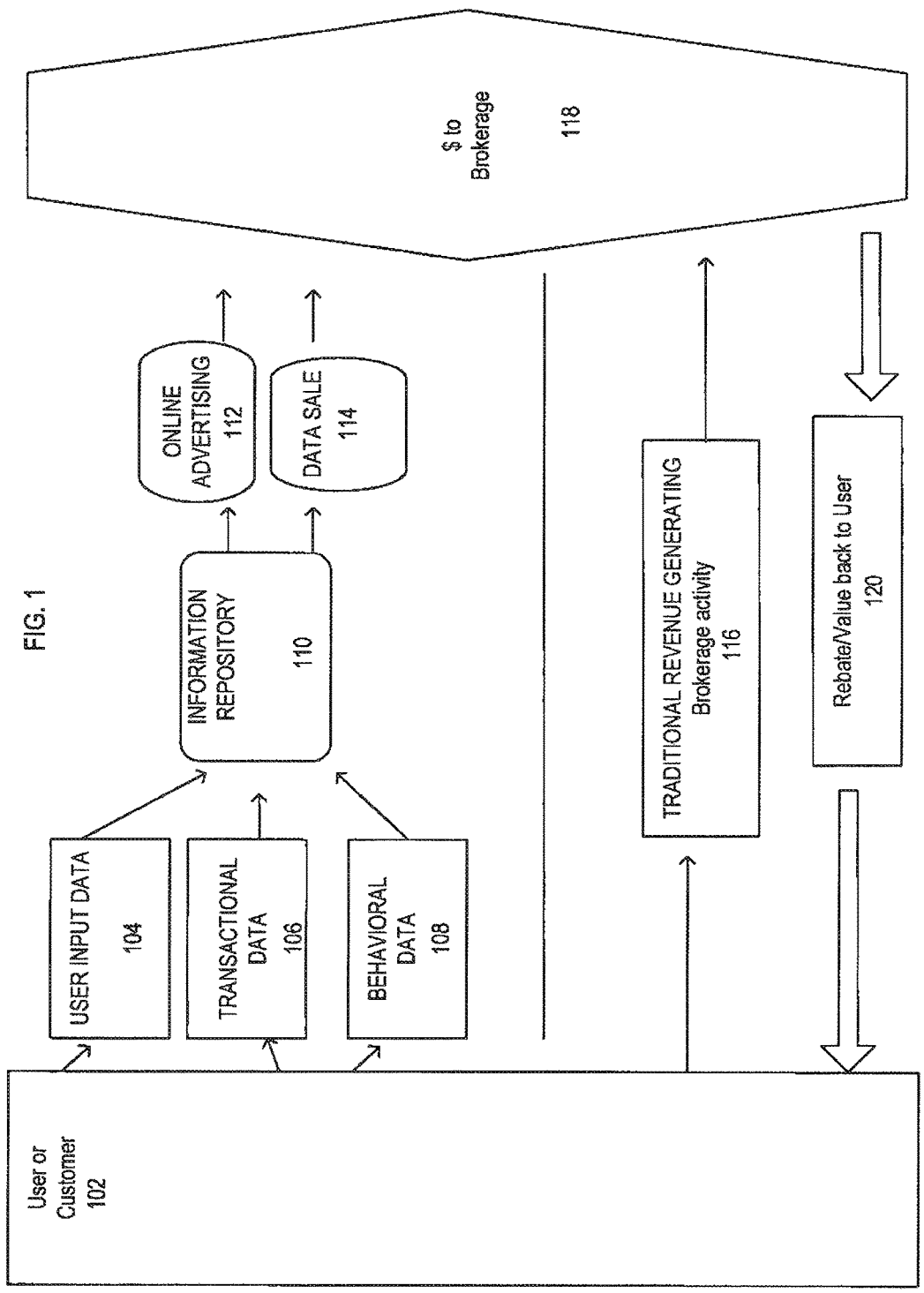

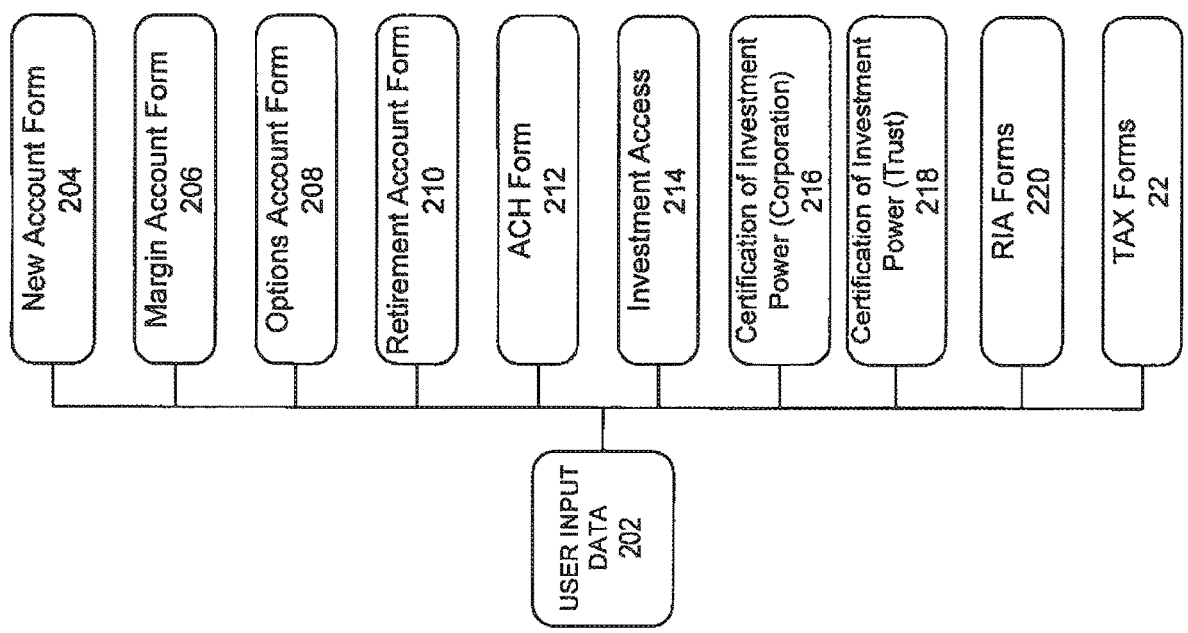

MONETIZING FINANCIAL BROKERAGE DATA

CROSS-REFERENCE TO RELATED APPLICATIONS

This present application is a continuation of U.S. patent application Ser. No. 16/232,731 filed Dec. 26, 2018, which is a continuation of U.S. patent application Ser. No. 14/589,302 filed Jan. 5, 2015, which is a continuation of U.S. patent application Ser. No. 13/489,301 filed Jun. 5, 2012, which claims priority to U.S. Provisional Application No. 61/636,508 filed Apr. 20, 2012. All applications are incorporated by reference in their entirety herewith.

TECHNICAL FIELD

The disclosed embodiments relate generally to data analytics. More particularly, the disclosed embodiments relate to monetizing financial brokerage data.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 1 illustrates a high-level overview of the monetization model based on analytics of user brokerage data and other data, according to certain embodiments of the invention.

FIG. 2 further illustrates some forms of user input data, according to certain embodiments of the invention.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, detailed personal information and financial information of a user of a financial brokerage account is cross referenced with the user's investment patterns, investment preferences and other online behavior of the user for purposes of data analysis and monetization.

According to certain embodiments, analytics of the user's financial brokerage account information and brokerage transactional behavior can be profiled to correlate dynamically with current world events to trigger investment offers and or commercial sales offers and or service offers to the user.

According to certain embodiments, analytics of a given user's financial brokerage account information and brokerage transactional behavior can be profiled for searches for additional data from public records on the given user or on other users with profiles similar to the given user to provide for further data analytics on the given user to trigger investment offers and or commercial sales offers and or service offers to the user.

According to certain embodiments, data analytics are used for building profiles for individual financial brokerage account holders as well as building profiles that are based on brokerage data and or other third party data that meet certain criteria for purposes of monetization in various industry segments.

According to certain embodiments, value may be returned to users of the financial brokerage account through free trades, money back, credits, coupons, promotional or other rewards programs. Free trades can also be provided to referral clients referred by a customer (user) of the financial brokerage account.

According to certain embodiments, a user need not fund his/her account in the financial brokerage. In other words, a user can open a "non-funded" brokerage account. The user can merely provide his/her detailed personal information and financial information to the financial brokerage. Such information can be used for data analysis and monetization.

According to certain embodiments, data analytics of the user data include building various data taxonomies, user classification profiles, profile clusters, and rules engine for predicting behavior or that satisfies criteria for various market segments.

According to certain embodiments, free trades include commission-free trades. The customer is not charged a sales charge or commission associated with the customer's brokerage transaction.

According to certain embodiments, free trades include spread-free trades. In such trades, the spread between the bid and ask price is eliminated.

According to certain embodiments, free trades include one or more of the following: 1) no load on mutual fund transactions, 2) eliminating principal's fees on fixed income securities transactions, and 3) eliminating principal's fees on equity securities transactions.

According to certain embodiments, value can be returned to the user/customer of the financial brokerage account by providing the user/customer unlimited number of free trades. Also, value can be returned to the user/customer of the financial brokerage account by providing the user/customer unlimited number of free trades for an unlimited period of time.

According to certain embodiments, in addition to providing free trades, value may be returned to users/customers of the financial brokerage account by providing one or more of the following: 1) free check writing, 2) free bill payments, 3) eliminating annual fees on the customer's account, 3) eliminating transfer fees for the customer's account, 4) eliminating fees for debit card transactions, 5) eliminating fees for credit card cash advances, 6) eliminating fees on the customer's retirement account, 7) eliminating maintenance fees for employee stock option plans, 8) eliminating wire transfer fees for the customer's account, 9) eliminating ATM fees for the customer's account, and 10) eliminating ACH fees for the customer.

According to certain embodiments, in addition to providing free trades, value may be returned to users/customers of the financial brokerage account by eliminating fees for market data services. Market data services can include providing real time quotes and/or streaming quotes to the customer/user of the financial brokerage account.

According to certain embodiments, value can be returned to a user who has an account (whether funded or unfunded) in the financial brokerage by providing an online shopping site associated with the financial brokerage and where the brokerage user can shop and accumulate credits. Further, data analysis can be performed on the user's shopping behavior in conjunction with the user's personal and financial information. Users can shop by redeeming credits/coupons provided by the financial brokerage as a return of value to the user.

According to certain embodiments, a user/customer of the financial brokerage account may be any one of the following non-limiting entities: an individual, a for-profit business entity, a charitable organization, a scholastic institution, a public works entity, a government entity, a sovereign wealth fund, a trust fund, or an institutional investor.

FIG. 1 illustrates a high-level overview of the monetization model based on analytics of user brokerage data and other data, according to certain embodiments of the invention. In FIG. 1, the user/client 102 of a financial brokerage account, in the course of using the brokerage services, inputs user input data 104, transactional data 106, and behavioral data 108. User input data 104, transactional data 106, and behavioral data 108 are described in greater detail herein. According to certain embodiments, user input data 104, transactional data 106, and behavioral data 108 are stored in an information repository 110. Data analytics is performed on the data stored in the information repository 110 to generate monetizable data information 112. Data information 112 is monetized to generate revenue for the financial brokerage company 118. In addition, traditional financial brokerage activity 116 also generates revenue for the financial brokerage company 118. According to certain embodiments, the financial brokerage company 118 returns value 120 to the user. Some non-limiting examples of value returned to the user include free trades, money back, credits, coupons, promotional or other rewards programs. The data analytics performed on the data stored in the information repository 110 is described in greater detail herein.

FIG. 2 further illustrates some forms of user input data. FIG. 2 shows that user input data 202 includes new account data 204, margin account data 206, options account data 208, retirement data 210, ACH data 212, investment access data 214, certification of investment power (corporation) data 216, certification of investment power (trust) data 218, RIA data 220, and tax data 222, according to certain embodiments. Such data is described in greater detail herein.

New Account data: According to certain embodiments, some non-limiting examples of new account data include the following.
 Account Type—Individual, Joint, Custodial, Retirement (IRA/Roth IRA/401k/Sep IRA), Entity (LLC, S CORP, C CORP, Investment Club, Partnership)
 Name
 Home Address
 City
 State/Territory
 Zip Code
 Social Security number/Tax ID number
 Date of Birth
 Marital Status
 Country of Citizenship
 Primary ID Document
 Primary ID Document Number
 Home Phone
 Cell Phone
 Fax Number
 Email Address
 Twitter information
 Facebook information
 Other Social Media information
 Occupation
 Employer Name
 Employer Address
 Employer City
 Employer State
 Employer Zip
 Annual Income
 Net Worth—Excluding Home
 Liquid Net Worth
 Tax Bracket
 Spouses Name, First, Last
 Spouses Occupation
 Spouses Employer
 Spouses Date of Birth
 Spouse Email Address
 Number of years as investor
 Number of dependents (including self)
 Clients Investment experience (none, limited, average, extensive, Registered Investment Advisor)
 Source of Funds (Business, Self Employment, Gift, Inheritance, Investment Income, Sale of Asset, Savings, Settlement, Wages, Income)
 Account Source—How did you hear about us?
 Investment Objective (Preservation of Principal, Conservative Growth, Aggressive, Speculation)
 Is primary client or immediate family member affiliated or employed by another Broker Dealer member firm?
 If yes, indicate Firm name and position (proper authorization must be obtained from the member firm)
 Is primary client or an immediate family any of the following: director, shareholder with 10% or more of stock, or a policy-making executive officer of a publicly traded company? If yes, indicate company and position
 Is the account traded by a third party? yes, state the name/address of the third party trading authority form may be required)
 If Will a third party be provided with: Duplicate confirmations, Duplicate Statement
 Cash Sweep Selection (None, WIN/CIP, Prime MMF Sweep)
 Standing Instructions
  Buy (Hold in Firm Name, Transfer and Ship, Transfer and Hold)
  Sell (Hold Proceeds in Account, send Proceeds—net Sell, Send proceeds as Designated—No netting)
  Dividend/Interest (Hold Funds, Pay Monthly, Pay Weekly, Pay Daily)
 Other Financial Institutional accounts (Savings, Checking, Credit Cards, Brokerage, Mortgage)

Margin Account data: According to certain embodiments, some non-limiting examples of margin account data include the following.
 Authorization and acknowledgement of terms and conditions
  1. Name and address
  2. Account owner signature
  3. Title (e.g., President, Partner, Trustee, Custodian)

4. Phone number
5. Occupation
6. Employer
7. Financial advisor signature

Options Account data: According to certain embodiments, some non-limiting examples of options account data include the following.
   Trading Authority?
   Date of ODD Delivery
   Options Experience
      Covered Calls _____
      Buying _____
      Spreads _____
      Uncovered Puts with Margin _____
      Uncovered Puts with Cash _____
   Type of Options Trading desired
      Covered Calls
      Buying
      Spreads
      Uncovered Puts with Margin _____
      Uncovered Puts with Cash
   Authorization and acknowledgement of terms and conditions
      Name and address
      Account owner signature
      Title (e.g., President, Partner, Trustee, Custodian)
      Phone number
      Occupation
      Employer
      Financial advisor signature Retirement Account data: According to certain embodiments, some non-limiting examples of retirement account data include the following.
   Type of Retirement Account (ROTH/IRA/SEP)
   Beneficiary Name
   Beneficiary Address
   Primary or Contingency
   Relationship to Beneficiary
   Tax ID #
   Date of Birth
   Percentage of Beneficiary
   Witness per state
   IRA Check Writing
   Authorization and acknowledgement of terms and conditions ACH data: According to certain embodiments, some non-limiting examples of ACH account data include the following:
   Account Type—Individual, Joint, Custodial, Retirement (IRA/Roth IRA/401k/Sep IRA), Entity (LLC, S CORP, C CORP, Investment Club, Partnership)
   Bank Name
   Account Name
   Account Type
   ABA Routing number
   Account Number
   Dividends?
   Occurrence (Monthly/Weekly/Quarterly/Semiannual/Annual)
   Start Date
   End Date
   On Demand
   Authorization and acknowledgement of terms and conditions Investment Access data: According to certain embodiments, some non-limiting examples of investment access data include the following.
   Checking
   To be printed on Check—(Telephone Number/Address/Drivers License)
   Visa Gold
   Mothers Maiden Name
   Authorization and acknowledgement of terms and conditions Certification of Investment Power (Corp) data: According to certain embodiments, some non-limiting examples of certification of investment power (Corp) data include the following.
   State of Incorporation
   Year of Incorporation
   Tax Id Number
   Enter in Transactions to:
      Buy
      Sell
      Convey
      Pledge
      Mortgage
      Lease
      Transfer Title or otherwise acquire or dispose of interest in real or personal property including with limitation stocks, bonds, notes, warrants, annuities, futures, currencies, commodities
      Exceptions _____
   Pledge Securities (yes/No)
   Allow Margin (Yes/No)
   Allow:
      Options
      Covered Call writing/Protective Put
      Cash Back Puts
      Purchasing Puts/Calls
      Spreads
      Naked Call/Put
      Other _____
   Authorization and acknowledgement of terms and conditions
      1. Name and address
      2. Account owner signature
      3. Title (e.g., President, Partner, Trustee, Custodian)
      4. Phone number
      5. Occupation
      6. Employer
      7. Financial advisor signature Certification of Investment Power (Trust) Data: According to certain embodiments, some non-limiting examples of certification of investment power (Trust) data include the following.
   Date of Trust
   Tax Id number
   Name of each Grantor/Settler/Plan Sponsor
   Date of Latest Trust Plan Amendment
   Enter in Transactions to:
      Buy
      Sell
      Convey
      Pledge
      Mortgage
      Lease
      Transfer Title or otherwise acquire or dispose of interest in real or personal property including with limitation stocks, bonds, notes, warrants, annuities, futures, currencies, commodities
      Exceptions _____
   Pledge Securities (yes/No)
   Allow Margin (Yes/No)

Allow:
  Options
  Covered Call writing/Protective Put
  Cash Back Puts
  Purchasing Puts/Calls
  Spreads
  Naked Call/Put
  Other _____
Authorization and acknowledgement of terms and conditions
  1. Name and address
  2. Account owner signature
  3. Title (e.g., President, Partner, Trustee, Custodian)
  4. Phone number
  5. Occupation
  6. Employer
  7. Financial advisor signature
RIA data: According to certain embodiments, some non-limiting examples of RIA data include the following.

Account Information

Name
Account Number
Duplicate IRA form
Firm Name/Firm ID
Eligible Asset Value$ _____
Annual Fee _____%
Payment Method—(Automatically deduct from account/Bill Directly to client/Deduct form another Account _____

Billing Cycle
  Cycle 1—January, April, July, October
  Cycle 2—February, May, August, November
  Cycle 3—March, June, September, December
  Authorization and acknowledgement of terms and conditions Risk Profile Questionnaire Advisory account represents what percentage of total investable assets (Less than 20%, 21%-50%, 51%-75%, 76%-100%)
When do you expect to begin withdrawing significant funds from account (Less than 1 year, 1-2 yrs, 3-4 yrs, 5-7 yrs, 8-10 yrs, 11+ yrs)
Once you begin withdrawing, how long do you expect portfolio to last (Lump sum distribution, 1-2 yrs, 3-4 yrs, 5-7 yrs, 8-10 yrs, 11+ yrs
Portfolio selection regarding inflation (pick one)
  Portfolio 1—likely exceed LT inflation by significant margin and has high degree of volatility
  Portfolio 2—likely exceed LT inflation by moderate margin and has high degree of volatility
  Portfolio 3—likely exceed LT inflation by small margin and has small to moderate degree of inflation
  Portfolio 4—likely match inflation and has low degree of volatility
Hypothetical Portfolio with average return, probability of higher value and lower value after 1 yr (pick one)

| | | |
|---|---|---|
| $105,000 | 83% | 17% |
| $106,200 | 79% | 21% |
| $107,400 | 76% | 24% |
| $108,500 | 73% | 27% |
| $109,500 | 71% | 29% |

Investment Goals (pick one)
  Protect value of portfolio, accept lower LT returns. Conservative
  Minimum Risk, try to achieve slightly higher returns. Conservative
  Balance moderate level of risk with moderate level of returns
  Maximize LT returns, accept dramatic ST fluctuations in value
Reaction to a 20% short term loss, consistent with market (pick one)
  Not change portfolio or invest more in portfolio
  Wait at least 1 yr before changing to more conservative
  Wait at least 3 months before changing to more conservative
  Immediately change to more conservative
Graph of hypothetical portfolios with potential gains, expected potential, and potential loss (pick one)
Preliminary Risk Profile score
Profile Customization. Reason for customization
Final Risk Profile Selection
Tax data: According to certain embodiments, some non-limiting examples of tax data include the following.
W-9
  Check if subject to backup withholding
  Check if presently applying for Taxpayer ID
  Check if you are exempt from backup withholding and information reporting
  Internet gambling Attestation (required for all entity accounts)
  Authorization and acknowledgement of terms and conditions
  Disclosure of Account Information—
  Under the SEC Rule 14B-1(c), we will be obligated to provide your name, address and securities positions to each requesting company whose securities we hold for your account unless you object to such disclosure.
  If you object _____
W-8
  Name
  Type Of Beneficial Owner
    Individual
    Corporation
    Disregarded Entity
    Partnership
    Simple/Grantor/Complex Trust
    Estate
    Government
    International Organization
    Central Bank of issue
    Tax Exempt organization
    Private Foundation
  Permanent Address
  Mailing Address
  US Taxpayer ID (if required)
  Foreign Taxpayer ID if any
  Certification that: (check all that apply)
    The beneficial owner is a resident of _____
    If required, the US Tax ID is stated above
    The beneficial owner is not an individual, derives the item(s) of income for which the treaty benefits are claimed
    The beneficial owner is not an individual, is claiming tax treat benefits for dividends received from a foreign corporation
    The beneficial owner is related to the person obligated to pay income within the meaning of section 267(b)

Transactional data: According to certain embodiments, some non-limiting examples of transactional data include the following.

Firm/Branch identifier
Account Number
Marginable (Exchange listed marginable, not marginable OTC, marginable OTC, no info)
Account Type (street side account, cash, margin, when issued, dividend/interest account, non-purpose loan account, short margin account, special subscription account, convertible bond account, non-convertible bond account, COD cash on Delivery account, COR cash on receipt account)

EQUITIES (Stocks, Warrants, Preferred,)

Traded on the following market centers
1. ArcaEdge,
2. BATS BYX (BYX)
3. BATS Global Markets (BTRADE)
4. Bloomberg Tradebook (BTRADE)
5. CBOE Stock Exchange (CBSX)
6. Chicago Stock Exchange (CHX)
7. DIRECTEDGE (DRCTEDGE)
8. DIRECTEDGE (EDGEA)
9. IB VWAP Dealing Network (VWAP)
10. Instinet
11. INET (Island)
12. ISE Stock Exchange (ISE)
13. Knight Securities,
14. LaveFlow ECN (LAVA)
15. NASDAQ (NASDAQ)
16. NASDAQ OMX BX (BX)
17. NASDAQ OMX PSX (PSX)
18. National Stock Exchange (NSX)
19. New York Stock Exchange (NYSE)
20. NYSE AMEX (NYSE, AMEX)
21. NYSE Arca (ARCA)
22. Pink OTC Markets (PINK)

Trade Date
Settlement Date
  As of Date
  Security Number
  CUSIP
  Quantity
  Price
  Buy or Sell
  Cancel Rebill indicator
  Blotter Code
  Discretion Exercised (yes, No)
  Accrued Date
  Principal
  SEC Fee
  Commission
  Net Amount
  Symbol
  Special Tax Indicator
  Discount
  Commission Codes
  Handling Fee
  Basis
  Security Subtype
  Sales Credit Code and Amount
  Nasdaq
  Order Number
  Execution Time
  Market Price
  State Tax
  Credit Interest ETF (Exchange Traded Funds)

Traded on the following market centers
  1. CBOE Stock Exchange (CBSX)
  2. Chicago Stock Exchange (CHX)
  3. NASDAQ OMX BX (BX)
  4. National Stock Exchange (NSX)
  5. New York Stock Exchange (NYSE)
  6. NYSE AMEX (NYSE, AMEX)
  7. NYSE Arca (ARCA)

Trade Date
Settlement Date
As of Date
Security Number
CUSIP
Quantity
Price
Buy or Sell
Cancel Rebill indicator
Blotter Code
Discretion Exercised (yes, No)
Accrued Date
Principal
SEC Fee
Commission
Net Amount
Symbol
Special Tax Indicator
Discount
Commission Codes
Handling Fee
Basis
Security Subtype
Sales Credit Code and Amount
Nasdaq
Order Number
Execution Time
Market Price
State Tax
Credit Interest FIXED INCOME (Corporate Bonds, Treasuries, CMO, FNMA, GNMA, UITs & Municipal Bonds)

Traded on the following market centers
  1) Bond Desk
  2) Knight BondPoint
  3) Knight BondPoint for Munis
  4) Knight BondPoint for US Government Securities
  5) MuniCenter
  6) NYSE Arca Bonds (NYSE BONDS)
  7) Timber Hill Auto-Ex Bonds
  8) TradeWeb
  9) TradeWeb for Munis
  10) TradeWeb for US Goverment Securities Factor
Muni-CB
Accrued Interest
Sales Credit Code and Amount
Trade Date
Settlement Date
As of Date
Security Number
CUSIP Quantity
Price
Buy or Sell
Cancel Rebill indicator
Blotter Code
Discretion Exercised (yes, No)
Accrued Date
Principal
SEC Fee
Commission
Net Amount
Symbol
Special Tax Indicator
Discount
Commission Codes
Handling Fee
Basis
Security Subtype
Sales Credit Code and Amount
Order Number
Execution Time
Market Price
State Tax
Credit Interest Options Traded on the following market centers
NYSE Amex (NYSE AMEX)
Chicago Board of Exchange (CBOE)
Pacific Stock Exchange (PSE)
NASDAQ OMX (NASDAXOM)
Philadelphia Stock Exchange (PHLX)
International Stock Exchange (ISE)
BATS Global Markets (BATS)
Boston Options Exchange (BOX)
CBOE C2 (CBOE2)
Option Type (Put, Call)
Underlying Security (for Options)
Strike Price
Expiration Date (Month & Year)
Trade Date
Settlement Date
As of Date
Security Number
CUSIP
Quantity
Price
Buy or Sell
Cancel Rebill indicator
Blotter Code
Discretion Exercised (yes, No)
Accrued Date
Principal
SEC Fee
Commission
Net Amount
Symbol
Special Tax Indicator
Discount
Commission Codes
Handling Fee
Security Subtype
Order Number
Execution Time
Market Price
State Tax Option level code
1. Covered Equity/Index Call Writing
2. Purchasing Equity/Index Puts against a Long Stock Position
3. Cash-Backed Equity/Index Put Writing
4. Purchasing Equity/Index/Foreign Currency Puts and Calls
5. Equity/Index Spreads
6. Equity/Index Put Writing on Margin
7. Uncovered Equity/Index Call Writing
8. Writing Equity/Index Combinations/Straddles Mutual Funds Mutual Fund Share Class
1. Front-end load with a sales charge greater than 4%
2. Back-end load subject to a contingent deferred sales charge (CDSC)
3. Level load
4. Closed-end fund traded like stock (security type C for common stock)
5. Exchange Traded Funds (security type C for common stock)
6. Low front end load with a sales charge of less than 2%
7. Multi-class fund that allows exchanges into or out of different share classes
8. Mid-front-end load with a sales charge of 2-4%
9. No front- or back-end load, although 12b-1 fees may apply
Prospect Required
Sales Credit Code and Amount
Trade Date
Settlement Date
As of Date
Security Number
CUSIP
Quantity
Price
Buy or Sell
Cancel Rebill indicator
Blotter Code
Discretion Exercised (yes, No)
Accrued Date
Principal
SEC Fee
Commission
Net Amount
Symbol
Special Tax Indicator
Discount
Commission Codes
Handling Fee
Basis
Security Subtype
Sales Credit Code and Amount
Order Number
Execution Time
Market Price
State Tax
Credit Interest Futures Traded on the following market centers
1. CBOE Futures Exchange (CFE)
2. CBOT (ECBOT)
3. CBOT (Floor-Based)

4. CME (Electronic-Globex)
5. CME (Floor-Based)
6. ELX Futures (ELX)
7. New York Mercantile Exchange (NYMEX)
8. New York Board of Trade (NYBOT)
9. NYSE Liffe (NYSELIFFE)
10. ICE Futures US (ICEUS)
11. OneChicago (ONE)

Trade Date
Settlement Date
As of Date
Security Number
CUSIP
Quantity
Price
Buy or Sell
Cancel Rebill indicator
Blotter Code
Discretion Exercised (yes, No)
Accrued Date
Principal
SEC Fee
Commission
Net Amount
Symbol
Special Tax Indicator
Discount
Commission Codes
Handling Fee
Basis
Security Subtype
Sales Credit Code and Amount
Order Number
Execution Time
Market Price
State Tax
Credit Interest

Managed Accounts—Advisor

Traded on the following market centers
 1. ArcaEdge,
 2. BATS BYX (BYX)
 3. BATS Global Markets (BTRADE)
 4. Bloomberg Tradebook (BTRADE)
 5. CBOE Stock Exchange (CBSX)
 6. Chicago Stock Exchange (CHX)
 7. DIRECTEDGE (DRCTEDGE)
 8. DIRECTEDGE (EDGEA)
 9. IB VWAP Dealing Network (VWAP)
 10. Instinet
 11. INET (Island)
 12. ISE Stock Exchange (ISE)
 13. Knight Securities,
 14. LaveFlow ECN (LAVA)
 15. NASDAQ (NASDAQ)
 16. NASDAQ OMX BX (BX)
 17. NASDAQ OMX PSX (PSX)
 18. National Stock Exchange (NSX)
 19. New York Stock Exchange (NYSE)
 20. NYSE AMEX (NYSE, AMEX)
 21. NYSE Arca (ARCA)
 22. Pink OTC Markets (PINK)
Trade Date
Settlement Date
As of Date
Security Number
CUSIP
Quantity
Price
Buy or Sell
Cancel Rebill indicator
Blotter Code
Discretion Exercised (yes,)
Accrued Date
Principal
SEC Fee
Net Amount
Symbol
Special Tax Indicator
Discount
Basis
Security Subtype
Annual Advisor Fee $
Annual Manager Fee $
Annual Advisor Fee %
Annual Manager Fee %
Name of Manager
Confirms Monthly (Y/N)
Order Number
Execution Time
Market Price
State Tax
Credit Interest

Private Placements

Issuer Name
Issuer Status—Public or Private
Symbol
CUSIP
Exchange where traded
Issuer Location
Issuer Industry
Issuer Market Cap on date of Investment
Investment use (Seed/Venture/Startup/Growth Capital/Refinance of debt/General Working Capital/Acquisition
Investment Type (Private Placement in Private Company, Private Placement in Public Company, IPO, Secondary Offering, Registered Direct Offering, Rights Offering)
Total Offering Amount $
Unit Size
Price Per Unit
Shares per Unit
Security Type Purchased
 1. Common Stock
    a) Price Per Share
 2. Convertible Preferred Stock
    a) Convertible Price
    b) Yield
    c) Term Behavioral data: According to certain embodiments, some non-limiting examples of behavioral data include the following.

Time/Date/Patterns of Transactions
Securities in Portfolio
Securities researched
Time/Date/Patters of incoming fund transfers and type of transfer
 (Wire/ACH/ACAT/Check/Check writing/Debit
Time/Date/Pattern/payee information of bill payments from account Securities transferred in and out and method (DTC, ACAT, etc . . . )

Credit and Debit Card Transactions

Credit check and address change: In addition, the brokerage system collects and stores credit check results and address change information associated with the customers/users of the brokerage system for purposes of data analytics and monetization, according to certain embodiments.

Data Analytics

Various data elements are organized before applying techniques of data analytics. A financial brokerage system has many types of information about the customer/user of the financial brokerage system. Some of the information is gathered at the time of registration and others accumulated over time based on the types of transactions the customer performs at the web site. For example, all the activity of the customer on the online financial brokerage system over time including time and frequency of visits to the online financial brokerage system will be captured by the financial brokerage system. In addition, the financial brokerage system can take advantage of data from outside sources to learn more about customer expectations and behavior. This may require working out the right agreements with partners for promotions and advertisements. For example, such data can include the purchase behavior of certain items like cars or insurance from ad networks or car dealers, for a profile of users that are potential buyers of such items that the financial brokerage system can identify with its own data. Other examples of data sources can include news feeds, court electronic databases (PACER), Department of Motor Vehicles, Internet, community multimedia centers, social networks, etc. In other words, the data from data sources outside of the financial brokerage system can be used in conjunction with brokerage data for purposes of data analytics. The data organization and analytics techniques and monetization objectives of the financial brokerage system can inform on the types of combinations of outside data sources with data from the financial brokerage system for monetization. The following non-limiting examples illustrate some useful data analytics of brokerage data in combination with other sources of data for predicting behavior or for making suggestions or offers to the customer of the financial brokerage account or for sharing information with various industry partners for purposes of monetization of data. The following examples are merely illustrative and are for purposes of explaining the concept of combining various sources of data with brokerage information in order to generate revenue for the financial brokerage company and to return value to the customer.

Monitor Online Portals

Example

UNESCO and Al Jazeera to promote freedom of expression in the Arab World.+marital status of customer (married)+joint account+H income of customer (high)+of customer net worth (high)+ W8 (non US Citizen from Egypt)+address of customer (indicating US main address)+4 dependents of customer+direct deposits into 3 custodial savings accounts of customer+address of customer=a donation to United Nations Educational Scientific and Cultural Organization.

Monitor Major News Outlets

Current Events

Example

The Pope visits Cuba, greeted by Raul Castro and later meets with Fidel Castro.+zip code (Miami Florida high latino density area)+income of customer+net worth of customer+wire transfer requests (to The Cuban American National Foundation)+account log in of customer and trading records of customer+occupation of customer (owns religious book store or professor at Christian school)=donation to Church (donation size varies based on income and net worth fields).

News example: batteries in electric cars are catching on fire+customer came to our site after visiting a hybrid car web site=change to purchase Hybrid car for customer Entertainment Industry News Example Justin Bieber is playing in LA+high net worth of customer+high income of customer+zip code+ Occupation of customer (attorney for Columbia Records)+2 custodial accounts of customer+age of custodian (11 and 13 years of age)+birthday of custodian around time of concert=purchase Justin Bieber tickets.

News of a New President, a More Liberal Vs. Conservative One

An anti war pro social programs president+income of customer+net worth of customer+zip code of customer+occupation of customer+tax bracket of customer+customer has defense stocks in portfolio=reduce and or sell military stocks in your portfolio.

Monitor Public Access to Court Electronic Records (PACER) www.pacer.gov "PACER is an electronic public access service that allows users to obtain case and docket information from federal appellate, district and bankruptcy courts and the PACER Case Locator via the internet.

Example

Court ruling deciding in favor of a challenge to a recent board decision in some town USA to only allow 1 house per 5 acre zoning instead of what had always been 1 house per 2 acre zoning.+gender of customer (male)+marital status of customer (married)+income of customer+net worth of customer+3 dependents+zip code of customer+occupation of customer (owns residential construction company)+college savings account of customer+also has business account (residential builders)+applied for special purpose business loan to build a 50 unit residential complex (we know this because he either applied for the loan through us or the bank he is getting the loan from is contacting us to verify the assets in his account held with us)+ interest rates reported by Yahoo finance to be low for years=building 100 residential units instead of 50.

Monitor Driving Records Online. e-DMV.org

Example 3 speeding tickets of customer, one of which was reckless driving and a suspended license+income of customer+net worth of customer+date of birth of customer (birthday in 1 week)+zip code of customer+investment objectives of customer (preservation of capital shows the person is conservative)+marital status of customer+bought tickets online from our points program for Scotch tasting event on birthday or visited Scotch taste testing site prior to or after coming to our website=needs a car and driver.

Example

Recent DWI of customer+marital status of customer (married)+income of customer+net worth of customer+current date (New Years Eve)+zip code of customer+3 dependents=rent limousine.

Monitor FINRA broker check—financial industry regulatory authority. FINRA BrokerCheck—is a free online tool to help investors check the professional
http://www.finra.org/Investors/ToolsCalculators/BrokerCheck Example Customer's investment broker (who has multiple infractions including unauthorized trades)+marital status of customer+income of customer+net worth of customer+zip code of customer+investment objectives of customer+address of customer+current date+(all fields filled out)=transfer account to new financial brokerage firm Monitor Weather report Example News of a severe storm headed in customer's direction (area New Orleans)+marital status of customer+income of customer (low)+net worth of customer (low)+customer owns home+2 dependents+zip code of customer (lower 9th ward)=purchase of ply wood to board up windows.

Example

News of a severe storm headed in customer's direction (area New Orleans)+marital status of customer+income of customer (high)+net worth of customer (high)+customer owns home+2 dependents+zip code of customer (affluent suburb of New Orleans)=suggest purchase upscale hotel room for two weeks.

News of a severe storm headed in customer's direction (area New Orleans)+marital status of customer (single)+income of customer (unemployed)+net worth of customer (high)+customer rents+zip code (apartment on Bourbon street)=take two week vacation in Jamaica (Jamaica because of previous intelligence gathered by financial brokerage system)

Customer Looking to Refinance Home

Example

Public records show, customer paid 100 k for house+credit report (states balance of loan 85 k)+indicates down payment below 20% on purchase=mandatory PMI (private mortgage insurance)+zillow appraisal (value of house)+lower interest rates+value of all accounts held by customer+zip code of customer+income of customer+net worth of customer+conservative investment objectives of customer+refinancing=New refinance (valuable to mortgage brokers also because of knowledge that mortgage brokers can now save the customer additional money by eliminating the PMI)

An important feature of monetizing customer behavior is the creation of one or more profiles of the customer of the financial brokerage system. The profile describes the customer's attributes. The profile can be used to provide the right advertisement or promotion when the customer is logged in. The profile can also be used to provide a list of customers to ad networks or other partners who are interested in offering some special promotions. New profiles can be created easily based on partner requirements. For example, a car dealer may have certain criteria that the profiles need to satisfy. For this level of flexibility, one or more taxonomies are created to classify the financial brokerage system customers for different profile needs.

The individual profile can be provided to marketers at different granularities to target advertisements. Profile clusters will be useful to marketers for making special promotions or offers. The financial brokerage system can give marketers the list of customers that fit into specific profile clusters with a measure of confidence (for example, 1-10). Further, marketers can work the financial brokerage system to create special profiles. The taxonomy and individual profiles will facilitate quick and easy way of creating new profile clusters.

Another feature of data analytics is around clusters of profiles. Profile clusters identify groups of customers/users that fit some specific profiles of interest.

Further, rules are generated to apply the individual profiles, attributes in taxonomy or profile clusters to test and learn customer behavior and thus predict future behavior. The rules can be used in multiple ways:
  Special promotion for those that satisfy certain rules
  When a rule gets triggered, inform marketers regarding the change to make special offers
  Use the trigger for internal use within the financial brokerage for promoting other products Methods of data mining include but are not limited to customer/user classification taxonomy, individual customer/user profile generation, profile cluster development and rules generation, regression analysis and learning & prediction.

Customer Classification Taxonomy: Create taxonomy that helps classify customers for different characteristics. A customer can belong to multiple nodes in the taxonomy. The taxonomy can be used to create individual profiles for quick access and to generate lists of customers that meet specific characteristics. The taxonomy is created after reviewing the different customer data items in the financial brokerage system. The following is a non-limiting example of a taxonomy. The taxonomies are based on the objectives of the financial brokerage system and can vary from implementation to implementation.

Gender
    Male
    Female
Age
    < 30 years
    30 - 40
    40 - 50
    50 - 60
    60 - 70
    > 70
Marital Status
    .....
    .......
Annual income
    < $100K
    .......
Net worth
    < $500K
    $500K - $1M
    .....
Occupation
    ......
Zip Code
    Average household income:
        < $500K
        $500K - $1M
        ....
    Or Average house value:....
      ......
Investment Objective
    Preservation of Principal
    Conservative Growth
    Aggressive
    Speculation
    ......
Risk Profile
    .....
Spouse's Occupation
    .....
Spouse's Age
    .....
Country of citizenship
    .....
Tax bracket
    .......
Employer Zip Code
    .......
Stocks
    .....
Trading style
    Daily
    Weekly
    Monthly
    .....
Children
    Elementary school
        1
        2
        3
        > 3
    Middle school
        1
        2
        ....
    High school
        ...
    College
        ....
    ....

Individual Customer Profile: For each customer all available information are stored (both internally available from the customer's use of the financial brokerage system and gathered from outside sources) in the profile. The data associated with the customer classification taxonomy are stored in the profile in the format that matches the nodes in the taxonomy. This taxonomy related information will be stored to match profile queries in an efficient manner.

Profile Clusters: Clusters are special profiles that match certain characteristics of interest to marketers, for example, based on industry behavior. Each cluster can have its own identifier or name. Each customer can be classified under multiple clusters. The following characteristics are merely examples for purposes of explanation.

Buyer of a security XYZ

Customers who login into account every day

Logs into account 30 minutes prior to market close and 30 minutes after market close Consistently buying low priced securities Age>X, Net worth>Y, Children in high school>1

. . .

Rules: Data analytics includes defining rules that predict behavior based on individual customer profile or profile clusters. The system can trigger alerts or action when the rules are satisfied. The following rules are merely examples for purposes of illustration.

a. A custodian on a custodial account (from individual profile)→buys things for the children, cares for the child b. With power of attorney and age→X→Need for assisted living c. Those buying low priced securities or deposit low priced securities→likely to invest in high risk instruments Learning and Prediction Customers can be classified for different partner needs or behavior prediction by learning through rules and clustering. Partners of the financial brokerage system can include commercial retailers, banks, advertising agencies, insurance companies, realtors, mortgage brokers, airline industry, entertainment industry, hospitality industry, recreation industry, etc. Both associative rules and decision trees will be used. Regression also will be used for learning and prediction.

The techniques described herein (rules and decision trees for classifications, clustering and regression) can be used for predictive analytics. Such techniques can be used when new accounts are created and when attributes for existing accounts change. The expected behavior of a new customer that fits into certain profile (e.g., a single parent with small children who just changed address will be expected to look for day care services) can be predicted using the rules that have been created in the system. Similarly when an attribute of the customer changes, the customer may fall into a new cluster and a new set of rules will apply to predict certain behavior. For example, for a customer that crosses a certain age (e.g., 65 years of age), new offers can be provided to this customer based on the rules in place for the new cluster.

Rules Learning: Rules are used in learning systems to predict behavior. The rules are looked up for the right conditions to decide the outcome. The antecedent or precondition of a rule is a series of tests, while the consequence or conclusion give the class or classes that apply to instances covered by the rule, or sometimes a probability distribution over the classes. The preconditions are logically ANDed together, and all the tests must succeed in order for the rule to trigger.

Examples of decision tree: The following is merely an example for purposes of illustration.

```
Net worth -> Age range -> Number of children => expected education
expense
Has power of attorney -> age of account holder => need for assisted
living
Married Status
    Single
        Income ( > $x)
            Number of dependents (> 0)
                Custodian Account (Yes)
                    Age of children (< 12)
                        Use day care center
    Married
        Income ( > $Y )
            Number of dependents ( >0 )
                Custodian Account ( Yes )
                    Age of children ( 5 -18 )
                        Use private school
```

Association rules: The following association rules are examples for purposes of explanation.
1. Customer buys low priced securities=>high probability of investing in high risk investments
2. Customer purchases security in portfolio=>owner of said security
3. Customer is custodian on a custodial account=>buys things for children Initial set of rules are created manually based on expertise and hypotheses. These rules can be created as decision trees or tables. 75% of existing information can be used for preparing these rules. This data is the training data set. The remaining 25% of the data is used for testing the rules. For example, consider the following sample rules:

Single+income+net worth+change of address+number of dependents+custodian account+age of minor=need for new day care center.

Married+high income+high net worth+change of address+number of dependents+custodian account+age of minor=need new private school The data values at each decision point for the above are created using the training data set and validated using the remaining data. The correlation results can be measured and can be visually presented to verify the correctness of the rules.

Clustering: Clustering is the process of discovering groups and structures in the data that are in some way "similar", without using known structures in the data.

Hierarchical clusters using information about gender, profession, net worth, number of children, stocks, etc., can be created. Probability based clustering can be used. Clustering can be directed with different types of seed data to evaluate the effectiveness of the resulting clusters. Seed data are initial sets of data to act as centroids of the different clusters. As a non-limiting example, if clusters are to be directed by net worth followed by investment risk profile, then clustering can be initiated with chosen sets for net worth and possibly randomly chosen investment risk profiles. Through multiple iterations, clustering will stabilize around centroids.

Classification: Classification is the process of identifying groups or rules to apply for new data items based on rules already created using examples. The financial brokerage system can use both association rules and decision trees for classification. For decision trees, one rule is generated for each leaf. The rules will be unambiguous in that the order of execution of the rules is irrelevant. To classify customers into different classes, association rules can be used.

When new customer data is entered into the financial brokerage system, the classification rules will be applied to identify the classes to which the customer belongs. For example, by using the decision trees, the customer can be classified as one needing day care center, need for assisted living, etc. Similarly, the association rules can be used to classify customers as high or low risk investors, those who buy things for children, etc.

Regression: Regression can be used for numeric data that fit statistical functions. Most commonly used techniques involve linear regression where the right fitting function can be derived using statistical packages. The idea is to express the class as a linear combination of attributes, with predetermined weights. For example, one situation where regression can be applied is to find a pattern between the number of transactions by the financial brokerage customers and login time before and after market close by the customers. If there is a relationship, one can predict the number of transactions for those customers logging in to the financial brokerage system at certain periods of time.

Some non-limiting examples of using data from external sources for predicting potential behavior and thus monetize the customer profiles already created are given below:
1. Profile clusters of profession (farmers) with specific investment risk profile (conservative investment portfolio) for an income range (above $250K) and owning some specific stock (owns Ford stock) can be expected to own Lincoln town cars. The output result (own Lincoln town cars) can be verified using data obtained from business partners of the brokerage system. This combination of brokerage data and data from a business partner of the financial brokerage system can be used to monetize this type of profile.
2. External news feeds can be monitored to trigger specific promotion events. Profile clusters of customers in certain zip codes (Miami) and income range with some specific occupation of the customer (own religious book store or professor at Christian school) can be expected to be willing to contribute to church in Cuba. Any news related to churches in Cuba could be of importance to this profile cluster, as an example. For example, news about the Pope visiting Cuba or Raul Castro announcing more religious freedom can be used to trigger a contact with organizations interested in contacting customers in the profile to request contributions.
3. As another example, the group of those customers who own electric cars (using the rule if the customer owns electric cars) can be used by advertisers on request or when news comes out about electric cars (e.g., battery catching fire) to inform the customers in the group about potential deals on hybrid cars. The latter can be further enhanced by monitoring the web sites the customer visited before coming to this site. If the customer logs in after visiting a hybrid car web site, the probability of his/her interest in a hybrid car is much higher.

Summarization

It is important to present the results of data analytics in a way that is easy to understand and that summarizes the results for the target audience. Different reports and charts and graphs can be prepared using standard reporting packages. Some sample reports can include the number of new customers that fit within the different classifications or profiles and the trends over a period of time. Another report can be the success rate of the different rules for classifications.

Heat map is another effective visual presentation to show data relationships in multiple dimensions. A heat map presents data within classes (or matrix) as colors. The size of each matrix represents the relative importance one attribute and the color can represent the relative importance of another attribute. For example, a representation of clusters around net worth in a heat map can represent the size of each cluster by the size of the rectangle and the color can indicate the number of transactions performed by each cluster. Red can indicate high activity and yellow low activity. Visually, such a representation is easy to understand and can easily identify which clusters have the most activity.

Processes

After the initial data models (classification taxonomy, rules, clusters and regression functions) are created, the system needs to be maintained on an on-going basis.

The initial taxonomy can be created manually by reviewing the customer data by the financial brokerage system internal experts. This can be enhanced over a period of time as the system learns more about customer behavior patterns and if higher degrees of granularity of profiles are needed.

Once the taxonomy is created individual profiles can be derived from it. An automated process can maintain the profiles on a regular basis. This will be a matter of looking up data values for each node in the taxonomy and keeping a bit pattern for the profile.

Clusters are created in different ways. Using the data of known industry behavior of interest of customers (those buying high risk instruments, those who put on a hedged position, etc.) a set of industry behavior clusters will be created.

Another set can be clusters of interest for predicting industry behavior of known groups or test hypotheses (those who log in into account 30 minutes prior to market close and 30 minutes after market close likely to perform transaction, those who check their account every day are likely to put on a hedged position, those who buy only funds likely to stay only within those bonds, etc.).

Clusters for non-industry behavior are created using hypotheses and on marketer's (or business partner of brokerage) request. Non-limiting examples can include:

Financial brokerage customer is a custodian on a custodial account (hypothesis: buys things for child, cares for child)

Financial brokerage customer with power of attorney and above certain age (hypothesis: likely to need assisted living)

Financial brokerage customers with kids that are coming of college age and customer has college fund (hypothesis: the liquidation and spending of fund assets, Funds are likely to be spent on college, room and board, transportation, textbooks, clothes etc.)

Financial brokerage customer profession (e.g. farmer) with conservative investment portfolio (likely purchases of such a customer: high degree of probability he/she will purchase crop insurance, low octane gasoline, and higher rated tires)

Financial brokerage customers falling within certain income ranges and with a certain number of children. Some changes in members of these dusters will be of interest to marketers (e.g., in some of these dusters, a change of address may indicate a need for new day care center or a need for private school). Sub dusters like those with single parent families will help refine the dusters.

Many of the clusters can be created automatically using the classification rules and association rules. In addition K-means clustering can be used to create new clusters using cluster centers chosen based on industry experience (as a non-limiting example, net worth+age). The data set can be split for building the models as well for testing them. Results of special promotions or targeted advertisements at these clusters will validate the hypothesis as well as refine the clusters.

Initial set of rules are created manually. Profile clusters can be used for generating rules. Some of the rules will be used in conjunction with clusters to trigger events. An example will be change in address for those in single parent with small children clusters needing new day care. The system will alert this change which will be used for sending special offer or promotion to the customer.

Creation of the rules and clusters is an iterative process. The data set aside outside of the training data set can be initially used for validations. For different rules and clusters, the expected precision and recall values can be defined. Tests will show how well the models work for the required precision and recall values. The models can be tuned to fit the expectation. The system can regularly monitor the effectiveness of the prediction against the rules using the precision and recall values as the guide.

New association rules can be identified as part of the learning process (e.g., a pattern about the timing of the change of address of single parent family can predict such changes in the future and hence certain behavior for purchases. As another example, some number of members of a cluster of 'risk investors' tend to purchase some types of instruments at certain periods of time, etc.). Some rules that include data from external sources may be difficult to validate, initially. But over a period of time enough data would be collected to validate the rules. Data provided by business partners of the financial brokerage system can be used to improve the rules in such cases.

Profiles can be automatically generated for new customers and appropriate clusters can be identified. Promotions or special offers can be made to these new customers. The new customers' behavior can be tracked against the rules to increase learning and improve the prediction in the system.

Data that does not fall into any category through any of the methods like classification, association, regression and clustering can be of significance. Such data can be reviewed to see if the data is really an anomaly or better tuning of the classification models can help identify new classes to fit such data. The precision and recall values in classification and clustering can be adjusted to experiment. New refined clusters can be created or rules can be modified for classification. This can be part of the on-going maintenance of the system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A computer-implemented method for monetizing financial brokerage accounts, the method comprising:
   storing in an information repository input data received online for a customer of a financial brokerage system;
   creating an individual profile for the customer describing attributes of the customer based on the input data of the customer stored in the information repository;
   automatically classifying the customer in one or more taxonomies based on the individual profile for the customer, each one of the one or more taxonomies being subject to a distinct set of rules satisfying criteria of the financial brokerage system;
   receiving, for each of a plurality of users including the customer, respective first transactional data indicative of one or more transactions involving the respective user and respective first behavioral data indicative of one or more behaviors of the respective user;
   executing a clustering algorithm using the first transactional data and the first behavioral data of the plurality of users to generate one or more profile clusters;
   mining data from the individual profile for the customer and the one or more taxonomies;
   executing a classification algorithm using the mined data in real-time to classify the customer in a first profile cluster of the one or more profile clusters, wherein the first profile cluster monetizes the mined data in real-time to predict customer behavior subject to the distinct set of rules;
   providing, via a website over the internet, the customer with free trades on a display screen of a device, wherein the at least one computer module monetizes the mined data by performing data analytics including automatically generating in real-time a new set of rules to learn customer behavior and to predict subsequent customer behavior, the new set of rules being generated in response to change in attributes of the customer;
   receiving, for the user, at least one of second transactional data or second behavioral data subsequent to predicting the customer behavior;
   updating in real-time over the internet on an on-going basis at least one of the clustering algorithms or the classification algorithm based on the predicted customer behavior and the at least one of the second transactional data or the second behavioral data, wherein the updating includes modifying the set of rules for the classification algorithm;
   and re-classifying, based on the at least one of the updated clustering algorithms or the updated classification algorithm, the customer in a second profile cluster.

2. The computer-implemented method of claim 1, wherein the free trades comprise commission-free trades.

3. The computer-implemented method of claim 1, wherein the free trades comprise eliminating a spread between bid and ask price.

4. The computer-implemented method of claim 1, wherein the free trades comprise no load on mutual fund transactions.

5. The computer-implemented method of claim 1, wherein the free trades comprise eliminating principal's fees on fixed income securities transactions.

6. The computer-implemented method of claim 1, wherein the free trades comprise eliminating principal's fees on equity securities transactions.

7. The computer-implemented method of claim 1, further comprising providing one or more of: free checking writing, and free bill payments.

8. The computer-implemented method of claim 1, further comprising eliminating annual fees for the customer's account.

9. The computer-implemented method of claim 1, further comprising eliminating transfer fees for the customer's account.

10. The computer-implemented method of claim 1, further comprising providing one or more of: no fee for debit card transactions, and no fee for credit card cash advances.

11. The computer-implemented method of claim 1, further comprising eliminating maintenance fees on the customer's retirement account.

12. The computer-implemented method of claim 1, further comprising eliminating fees for market data services.

13. The computer-implemented method of claim 12, wherein the market data services comprise: real time quotes, and streaming quotes.

14. The computer-implemented method of claim 1, further comprising eliminating maintenance fees for employee stock option plans.

15. The computer-implemented method of claim 1, further comprising eliminating wire transfer fees for the customer's account.

16. The computer-implemented method of claim 1, further comprising eliminating ATM fees for the customer's account.

17. The computer-implemented method of claim 1, further comprising eliminating ACH fees.

18. The computer-implemented method of claim 1, further comprising providing free trades to referral clients referred by the customer.

19. The computer-implemented method of claim 1, further comprising:
   automatically updating in real-time the classification of the customer from a first taxonomy of the one or more taxonomies to a different second taxonomy of the one or more taxonomies based on change in the attributes of the customer; and
   predicting the second taxonomy based on the distinct set of rules.

20. The computer-implemented method of claim 1, further comprising:
   automatically integrating the new set of rules into the distinct set of rules based on validation of the new set of rules over a period of time.

* * * * *